United States Patent [19]

Bermbach et al.

[11] Patent Number: 5,065,418

[45] Date of Patent: Nov. 12, 1991

[54] APPARATUS FOR THE TRANSILLUMINATION OF ARTICLES WITH FAN-SHAPED RADIATION

[75] Inventors: Rainer Bermbach, Mainz-Laubenheim; Gerhard Doenges, Heidenrod-Kemel; Georg Geus; Cornelius Koch, both of Wiesbaden, all of Fed. Rep. of Germany

[73] Assignee: Heimann GmbH, Fed. Rep. of Germany

[21] Appl. No.: 564,603

[22] Filed: Aug. 9, 1990

[30] Foreign Application Priority Data

Aug. 9, 1989 [EP] European Pat. Off. ........ 89114763.9

[51] Int. Cl.$^5$ ............................................. G01N 23/04
[52] U.S. Cl. .................................... 378/57; 378/62; 378/87; 250/358.1; 250/359.1
[58] Field of Search ............... 378/57, 58, 92, 99, 378/62, 86, 87, 88; 250/358.1, 359.1, 360.1

[56] References Cited

U.S. PATENT DOCUMENTS

| | | | |
|---|---|---|---|
| 4,599,740 | 7/1986 | Cable | 378/57 |
| 4,722,096 | 1/1988 | Dietrich et al. | 378/57 |
| 4,756,015 | 7/1988 | Doenges et al. | 378/57 |
| 4,817,121 | 3/1989 | Shimizu et al. | 378/57 |
| 4,841,554 | 6/1989 | Doenges et al. | 378/57 |
| 4,868,856 | 9/1989 | Frith et al. | 378/86 |
| 4,870,669 | 9/1989 | Anghaie et al. | 378/87 |
| 4,870,670 | 9/1989 | Geus | 378/87 |

FOREIGN PATENT DOCUMENTS

OS370884  3/1987  Fed. Rep. of Germany .
2113828   8/1983  United Kingdom .

Primary Examiner—Edward P. Westin
Assistant Examiner—Kim-Kwok Chu
Attorney, Agent, or Firm—Hill, Van Santen, Steadman & Simpson

[57] ABSTRACT

An apparatus for inspecting containers or vehicles at airports for illegal contents, such as bombs, weapons, drugs or smuggled goods includes two x-ray generators and two line-shaped radiation detectors, a first of the radiation detectors receiving radiation from a fan beam of a first radiation generator, and the second radiation detector receiving radiation from a fan beam of a second radiation generator. The respective central rays of the fan beams are disposed substantially perpendicularly realtive to each other.

7 Claims, 5 Drawing Sheets

APPARATUS FOR THE TRANSILLUMINATION OF ARTICLES WITH FAN-SHAPED RADIATION

BACKGROUND OF THE INVENTION

1. Summary of the Invention

The present invention is directed to an apparatus for inspecting articles using a fan-shaped radiation beam, and in particular to such an apparatus suitable for examining containers and/or vehicles at an airport to determine whether the containers and/or vehicles contain explosives, weapons, drugs, smuggled goods or the like.

2. Description of the Prior Art

An apparatus for examining containers to determine the presence of illegal articles is disclosed in German Utility Model 8506187, corresponding to U.S. Pat. 4,722,096. In this apparatus, the fan plane of a radiation generator is aligned perpendicularly to a conveying path for the containers. After passing through a partial cross-section of the container, the fan-shaped radiation beam is incident on a L-shaped line radiation detector, to which a means for signal evaluation is connected. For complete transillumination of the entire cross-section of the container, the radiation generator is pivoted through the fan angle, or alternatively three separate radiation generators may be used which generate respective fan-shaped radiation beams offset by the fan angle, so that the radiation from each fan beam is incident on a different region of the L-shaped radiation detector. The signals from the radiation detectors are processed in an image processing system while the container is being conducted past the radiation generator and the radiation detector on a conveying path formed by rollers. A radiation silhouette of the container is reproduced on a monitor.

SUMMARY OF THE INVENTION

It is an object of the present invention to provide an apparatus for inspecting articles by means of x-rays for determining illegal contents in the articles wherein the identifiability of items within the containers is improved.

The above object is achieved in accordance with the principles of the present invention in an apparatus having a radiation detector which receives radiation which has penetrated the article being inspected, and a computer following the radiation detector for calculating an image of the transilluminated article using the signals from the radiation detector, a memory in which a reference image of the article is stored, and a comparison circuit which is supplied with the image signals from the computer and with the signals from the memory of the reference image, so that a differential image can be displayed on a monitor derived from signals from the computer and the signals of the reference image.

An advantage of the apparatus is that only items in the article being inspected which are not contained in the reference image of the article are shown on the screen of the monitors. Easy locating of illegal goods is thereby possible.

It is preferable that a plurality of reference images be stored in the memory, with each image being called by a selection circuit, as needed. It is thus possible to call a reference image for each article being examined, and by comparison with the image formed by the computer, to locate items within the containers which do not correspond to the original condition of the container.

BRIEF DESCRIPTION OF THE DRAWINGS

FIG. I is a perspective of an apparatus for inspecting containers constructed in accordance with the principles of the present invention.

DESCRIPTION OF THE PREFERRED EMBODIMENT

Figure 1:
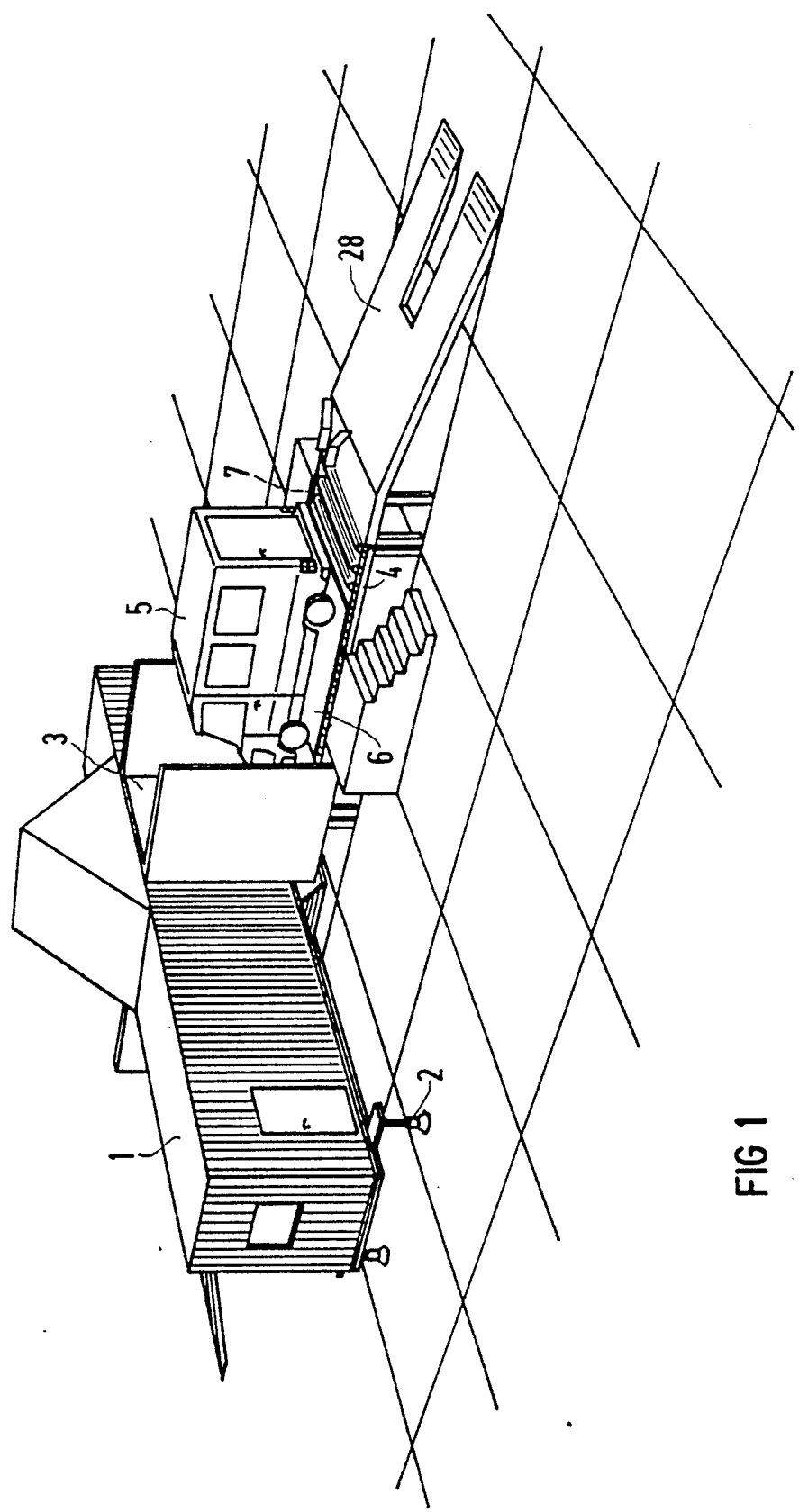

A complete apparatus for inspecting containers and/or vehicles for illegal goods constructed in accordance with the principles of the present invention is shown in FIG. 1. The apparatus includes an inspection unit 1, which may be a mobile trailer, which, when in stationary use, is seated on supports 2. The inspection unit 1 has a tunnel 3 extending therethrough, the tunnel being open at its entry and exit sides. A conveyor 4 for articles extends through the tunnel 3. The articles to be inspected may be, for example, luggage, large containers, or a vehicle 5 as shown in FIG. 1. The conveyor 4 has an x-ray permeable pallet 6 which is seated on driven rollers 7, which carries the container or vehicle 5 through the tunnel 3.

Figure 2:
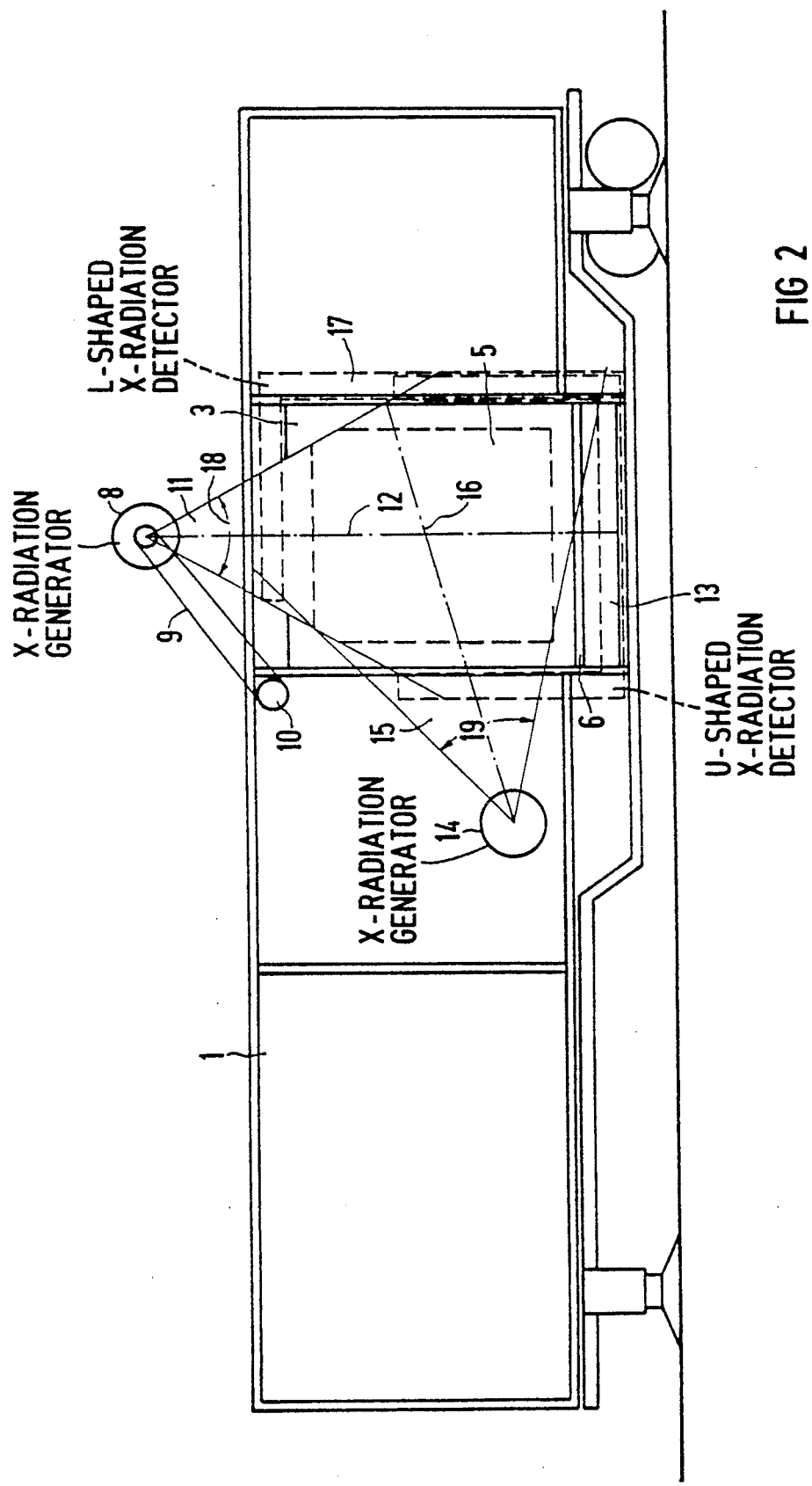
FIG. 2 is a side elevational view of the radiation generators and detectors in a mobile trailer used in the apparatus as in FIG. 1.

The inspection unit 1 is shown in side view and in partial longitudinal section in FIG. 2. Elements previously referenced in FIG. 1 have the same reference symbols in FIG. 2. In FIG. 2, the container or vehicle 5 has been moved on the pallet 6 into the tunnel 3. A first radiation generator 8 is provided, which is pivotable around an axis 10 which is parallel to the conveying direction of the conveyor 4. The pivoting occurs by means of an articulation 9. As a result, the distance of the radiation generator 8 from the container or vehicle 5 can be selectively set. The radiation generator emits a substantially planar fan beam 11 perpendicular to the conveying direction of the conveyor 4. The fan beam 11 has a central ray 12 which is vertically aligned so that radiation from the radiation generator 8 is incident on a U-shaped radiation detector 13.

A second radiation generator 14 is also provided. The radiation generator 14 generates a substantially planar fan beam 15, which is also perpendicular to the conveying direction of the conveyor 4. A central ray 16 of the fan beam 15 has an angle to a horizontal-plane, so that the radiation emitted by the radiation generator 14 is incident on a L-shaped radiation detector 17.

The U-shaped radiation detector 13 has a middle portion and surrounds three sides of said tunnel 3, which has a rectangular cross-section. The L-shaped radiation detector 17 has two legs and is arranged such, that one of said two legs is disposed opposite to said middle portion of said U-shaped radiation detector 13.

Figure 5:
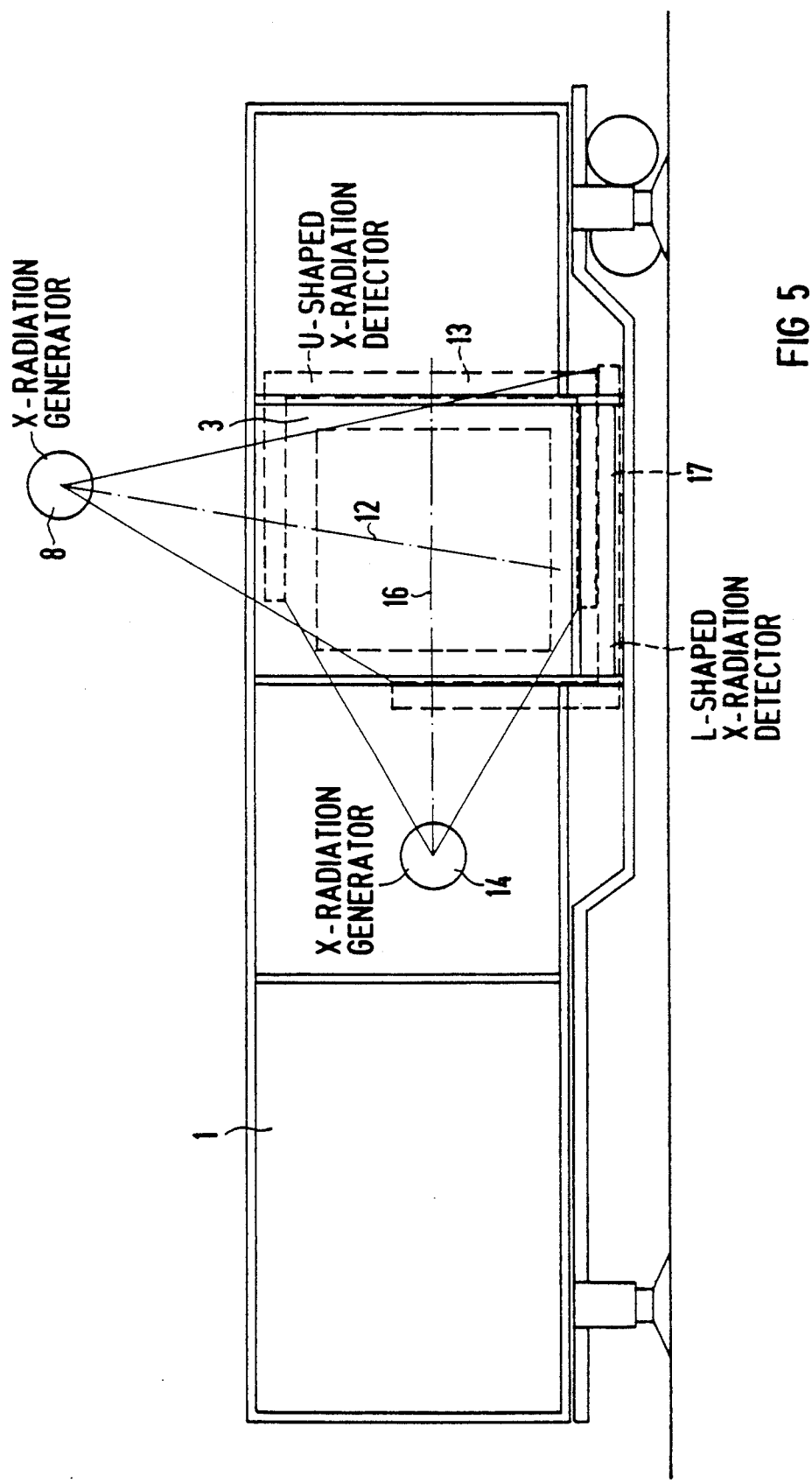
FIG. 5 is a side elevational view of another arrangement of the radiation generators and detectors shown in FIG. 2.

It is also possible to arrange said radiation generators 8, 14 and said radiation detectors 13, 17 such, that said central ray 12 of said radiation generator 8 has an angle to a vertical-plane, so that the radiation emitted by said radiation generator 8 is incident on said L-shaped radiation detector 17 and such that said central ray 16 of said radiation generator 14 is horizontally aligned, so that radiation from said radiation generator 14 is incident on said U-shaped radiation detector 13. This arrangement is shown in FIG. 5.

The fan angle 18 of the fan beam 11 of the radiation generator 8 is wide enough so that the fan beam 11 completely penetrates the cross-section of the container or vehicle 5 proceeding from above, and is incident on the U-shaped radiation detector 13. The fan angle 19 of the fan beam 15 is also wide enough so that the radiation from the radiation generator 14 completely penetrates the cross section of the container or vehicle 5 from the side, so that the radiation is incident on the L-shaped radiation detector 17.

It would also be possible to make the respective fan angles 18 and 19 of the radiation generators 8 and 14 smaller than would be necessary to encompass the entire cross-section of the articles being inspected, in which case the radiation generators 8 and 14 would be mounted so as to be pivotable around respective axes which are parallel to the conveying direction of the conveyor 4, so that pivoting the radiation generators 8 and 14 the entirety of the cross section of the container or article 5 can be penetrated by the radiation.

Figure 3:
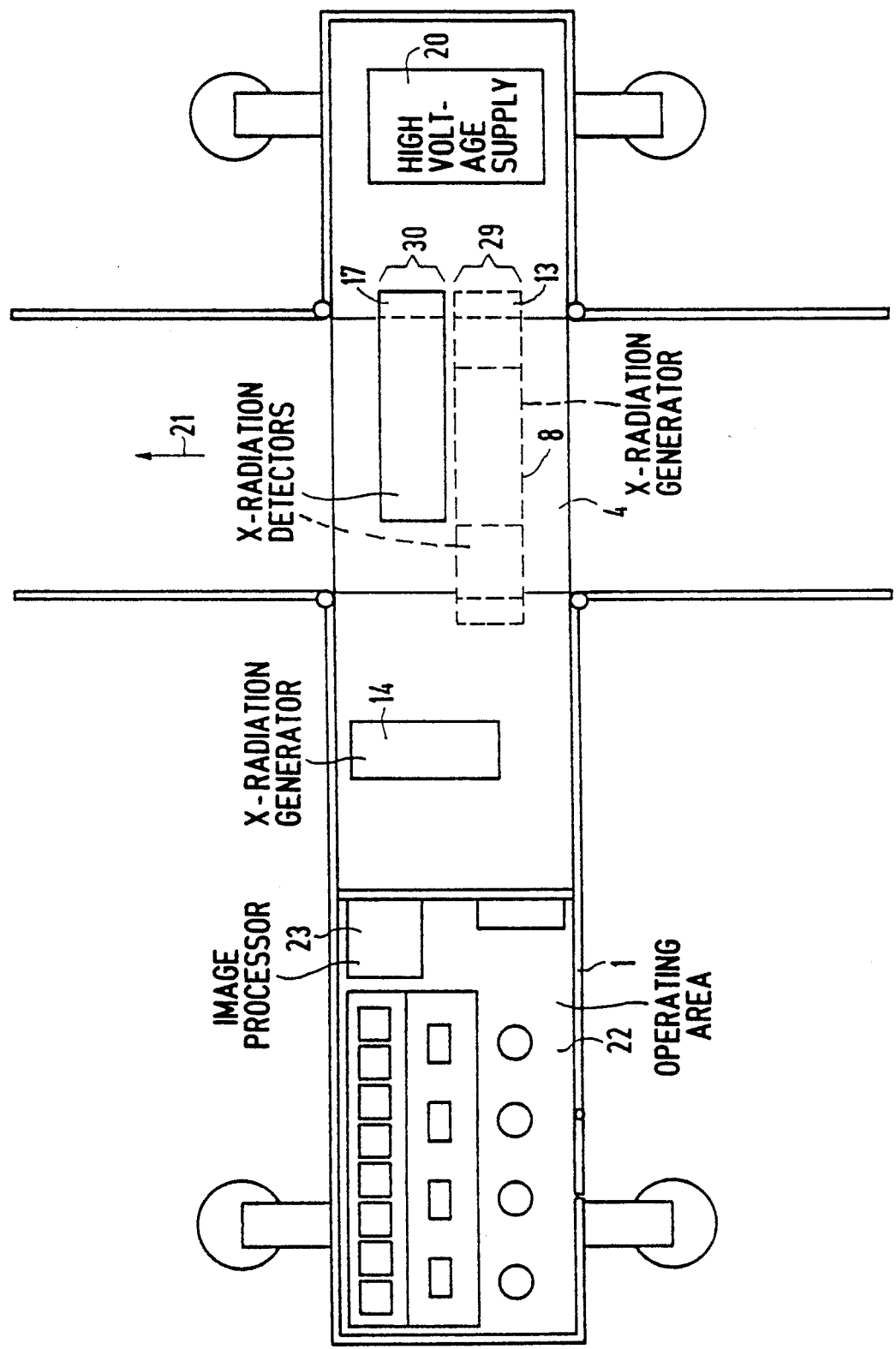
FIG. 3 is a plan view of the mobile trailer shown in FIG. 2.

The inspection unit 1 is shown in plan view in FIG. 3. As can be seen in FIG. 3, a power supply 20 is provided for the radiation generators 8 and 14 disposed in the inspection unit 1. The radiation detectors 13 and 17 and the radiation generators 8 and 14 are disposed laterally offset relative to each other in the conveying direction 21 of the conveyor 4. An operating area 22 is provided in the inspection unit 1 at which one or more operators can control the various components and can view the image of the article beam inspected. An image processor 23 is disposed in the operating area 22.

Figure 4:
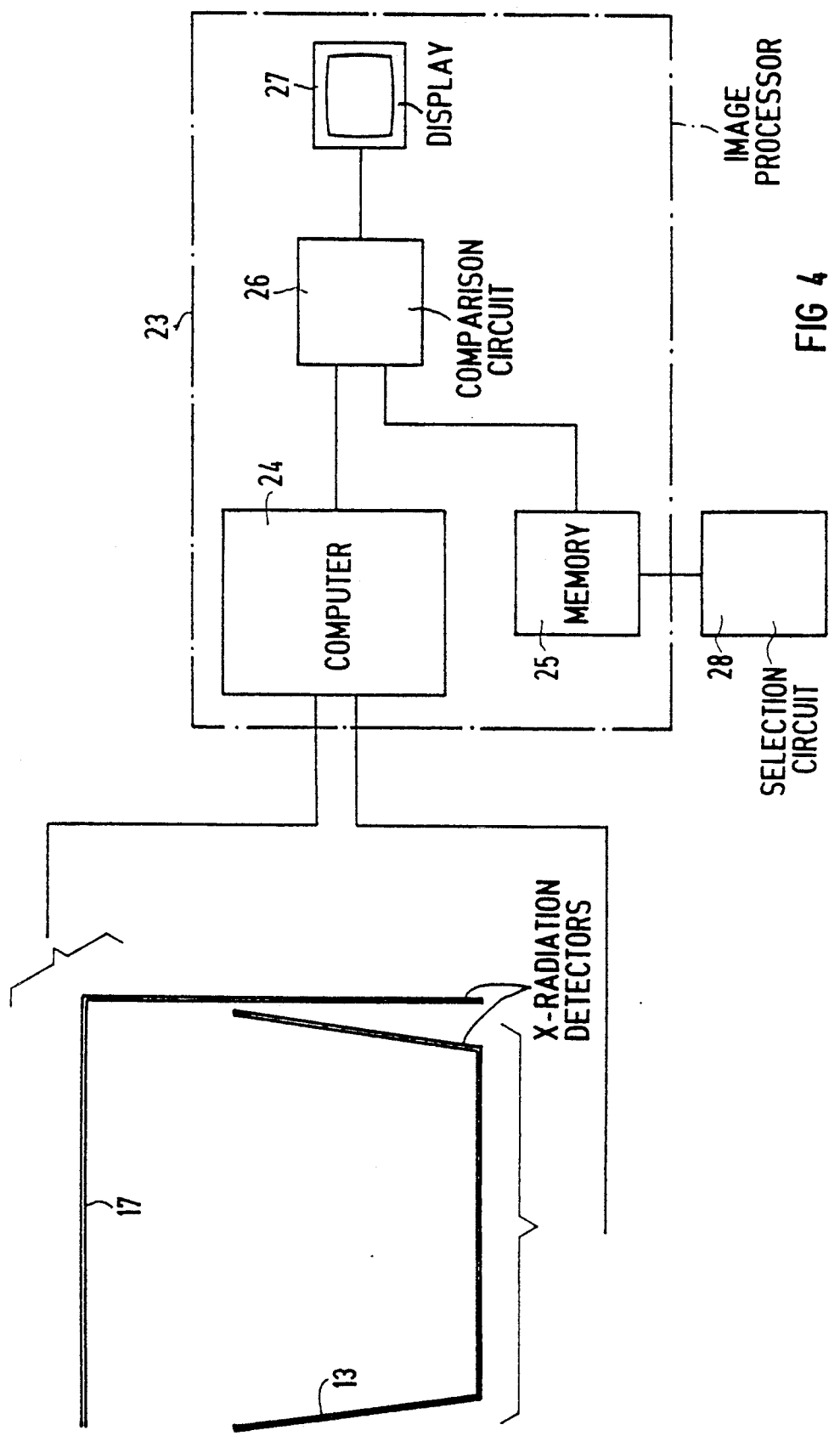
FIG. 4 is a schematic block diagram of the relevant electrical components of the apparatus of FIGS. 1, 2 and 3.

The basic components of the image processor are shown in FIG. 4, in combination with the radiation detectors 13 and 17. The signals from the radiation detectors 13 and 17 are supplied to a computer 24 which calculates an image in a known manner from the signals received from the detectors 13 and 17. A memory 25 is provided in which the signals of a reference image of the container or vehicle are stored. The storage capacity of the memory 25 can be sufficiently large so that a plurality of reference images for different vehicles and containers can be stored therein. A selection circuit 28, which is disposed in the operating area 22, is provided for calling a particular reference image stored in the memory 25. A comparison circuit 26 is supplied with the image signals from the computer 24 and with the signals of the reference image from the memory 25. The comparison circuit 26 is followed by a display 27 on which a differential image is displayed, derived from the image signals of the computer 24 and the signals of the reference image. The differential image will thus contain only items, if any, which are present in the article currently being inspected which were not present in the reference image.

For conducting an examination of a container or vehicle for illegal articles using the apparatus of the invention, the following procedure is undertaken.

If the article being inspected is a container, the container is placed by suitable means on the conveyor 4. If the article being inspected is a vehicle 5, the vehicle 5 is driven onto the conveyor 4 via a ramp 28, so that the article or vehicle 5 is disposed on the pallet 6 of the conveyor 4. After the driver has left the vehicle, the pallet 6 is moved into the tunnel 3 at a uniform speed by the driven rollers 7 of the conveyor 4. When the front end of the container or vehicle 5 reaches the region 29 (FIG. 3) of the conveyor 4, the radiation generator 8 is activated to emit radiation for the duration of the pass. The container or vehicle 5 is thereby completely penetrated by radiation from the radiation generator 8 in the vertical direction, the radiation being incident on the radiation detector 13 after penetrating the container or vehicle 5. The radiation detector 13 converts the radiation silhouette of the container or vehicle 5 into electrical signals, which are supplied to the computer 24.

When a region 30 (FIG. 3) of the conveyor is reached, the radiation generator 14 is activated to emit radiation which penetrates the container or vehicle 5 approximately horizontally, the radiation after penetrating the container or vehicle 5 then being incident on the radiation detector 17. The radiation detector 17 converts the lateral radiation silhouette of the container or vehicle 5 into electrical signals, which are also supplied to the computer 24. The container or vehicle 5 is thus transirradiated by slices, with the signals from the radiation detectors 13 and 17 for each slice being stored in a memory (not separately designated) of the computer 24. While the container or vehicle 5 is traversing the regions 29 or 30, or thereafter, the computer 24 calculates a complete radiation silhouette of the container or vehicle 5 from the signals of the radiation detectors 13 and 17. This image can be stored in a further memory (not separately identified) in the computer 24.

The walls of the inspection unit 1 are designed so that the entry and exit sides of the tunnel 30 can be open without impermissibly high radiation emerging from the openings. This can be achieved, for example, by a sufficiently strong lead shielding in the region of the radiation generators 8 and 14 and the radiation detectors 13 and 17.

Portrayal of the differential image derived from the image of the transilluminated container or vehicle 5 and from the reference image of the container or vehicle 5 is only one possibility using the image processing. As a result of this portrayal, only articles which were not contained in the reference image of the container or vehicle 5 are visible on the screen of the display 27. It is thus very easy to locate articles which do not correspond to the original condition of the container or vehicle, and then to conduct a physical inspection of those articles.

A further possibility for examining the container or vehicle 5 for illegal articles can be achieved by driving the radiation generators 8 and 14 with respectively different radiation energies. By comparing at least two congruent x-ray images which were obtained with respectively different radiation energies, it is possible to discriminate articles having low and high ordering number. Organic materials, such as drugs and explosives, can thus be clearly distinguished from other materials, for example metals (weapons). It is preferable that the difference in the radiation absorption at different radiation energies appear as information on the screen of the display 27, such as using different colors. Explosives and drugs can thus be easily identified.

As noted above, the inspection unit 1 can be in the form of a mobile trailer, so that it can be attached to a truck and be transported. The container can be dismantled for this purpose, with its individual components being transported on a plurality of trucks. Moreover, although the inspection unit 1 described herein has been shown of a size sufficient to transilluminate large containers and/or vehicles, a smaller version may also be used for inspecting hand-held luggage.

As can be seen in FIG. 2, the two legs of the U-shaped radiation detector 13 in FIG. 4 are disposed at an opposite angle relative to the center leg. This achieves an especially large entry width of the field of measurement.

Although further modifications and changes may be suggested by those skilled in the art it is the intention of the inventors to embody within the patent warranted hereon all changes and modifications as reasonably and properly come within the scope of their contribution to the art.

We claim as our invention:

1. An apparatus for inspecting articles to identify items within the articles, said apparatus comprising:
    means for generating a first x-ray fan beam;
    means for generating a second x-ray fan beam;
    means for moving an article to be inspected through said first and second x-ray fan beams in a direction perpendicular to said x-ray fan beams;
    first means for detecting radiation disposed to receive radiation from said first x-ray fan beam after penetrating said article, said first means for detecting radiation being U-shaped;
    second means for detecting radiation disposed to detect radiation from said second x-ray fan beam after penetrating said article, said second means for detecting radiation being L-shaped; and
    means for generating an image of said article from the radiation detected by said first and second means for detecting radiation.

2. An apparatus as claimed in claim 1 wherein said means for conveying has a conveying path and wherein said first means for detecting radiation has a middle leg and surrounds said conveying path on three sides, and wherein said second means for detecting radiation has two legs with one of said two legs disposed opposite said middle leg of said first means for detecting radiation.

3. An apparatus as claimed in claim 1 wherein said means for generating said first x-ray fan beam is disposed so that said first x-ray fan beam has a central ray which is vertically disposed and wherein said means for generating said second x-ray fan beam is disposed so that said second x-ray fan beam has a central ray disposed at an angle other than zero relative to the horizontal.

4. An apparatus as claimed in claim 1 wherein said means for conveying has a conveying direction, and further comprising:
    means for pivoting said means for generating said first x-ray fan beam so that said first x-ray fan beam is pivotable around an axis parallel to said conveying direction.

5. An apparatus as claimed in claim 1 wherein said means for conveying has a conveying direction, and further comprising:
    means for pivoting said means for generating said second x-ray fan beam so that said second x-ray fan beam is pivotable around an axis parallel to said conveying direction.

6. An apparatus as claimed in claim 1 wherein said means for conveying is a means for conveying large containers and vehicles.

7. An apparatus as claimed in claim 1 wherein said means for generating said first fan beam is disposed so that said first x-ray fan beam has a central ray disposed at an angle other than zero relative to the vertical and wherein said means for generating said second x-ray fan beam is disposed so that said second x-ray fan beam has a central ray which is horizontally disposed.

* * * * *